US008875981B2

(12) United States Patent
Neltner et al.

(10) Patent No.: US 8,875,981 B2
(45) Date of Patent: Nov. 4, 2014

(54) SYSTEM AND METHOD FOR A MICROREACTOR

(75) Inventors: Brian Neltner, Somerville, MA (US); David M. King, Canton, MA (US); Rick Bryan Woodruff, Boulder, CO (US)

(73) Assignee: Navolta LLC, Somerville, MA (US)

( * ) Notice: Subject to any disclaimer, the term of this patent is extended or adjusted under 35 U.S.C. 154(b) by 411 days.

(21) Appl. No.: 13/490,717

(22) Filed: Jun. 7, 2012

(65) Prior Publication Data

US 2012/0315199 A1   Dec. 13, 2012

Related U.S. Application Data

(60) Provisional application No. 61/494,548, filed on Jun. 8, 2011.

(51) Int. Cl.
*B01J 8/06* (2006.01)
*B01J 19/24* (2006.01)
*B23K 37/00* (2006.01)
*B23K 31/02* (2006.01)
*B23K 1/00* (2006.01)
*B01J 19/00* (2006.01)

(52) U.S. Cl.
CPC ........... *B23K 1/0008* (2013.01); *B01J 19/0093* (2013.01); *B01J 19/0046* (2013.01); *B23K 2201/36* (2013.01); *B01J 2219/00795* (2013.01); *B01J 2219/00822* (2013.01); *B01J 2219/00835* (2013.01); *B01J 2219/00869* (2013.01); *B01J 2219/00873* (2013.01); *B01J 2219/00876* (2013.01); *B01J 2219/00842* (2013.01); *B01J 2219/00286* (2013.01); *B01J 2219/00495* (2013.01); *B01J 2219/00511* (2013.01); *B01J 2219/0052* (2013.01); *B01J 2219/00585* (2013.01); *B01J 2219/0059* (2013.01); *B01J 2219/00747* (2013.01)
USPC ........................... 228/176; 228/101; 422/603

(58) Field of Classification Search
CPC .......... B01J 8/06; B01J 19/24; B01J 19/0093; B01J 19/1831; B23K 37/00; B23K 31/02
USPC .................................. 422/603; 228/101, 176
See application file for complete search history.

(56) References Cited

U.S. PATENT DOCUMENTS 4,650,964 A    3/1987   Vincent
5,228,505 A *  7/1993   Dempsey ...................... 165/140

(Continued)

FOREIGN PATENT DOCUMENTS

JP    2004-028628 A    1/2004
WO      93-16790 A1    9/1993

(Continued)

*Primary Examiner* — Walter D Griffin
*Assistant Examiner* — Huy-Tram Nguyen
(74) *Attorney, Agent, or Firm* — AKC Patents LLC; Aliki K. Collins (57) ABSTRACT

A cartridge microreactor includes a tubular heater, a metal capillary reaction tubing and a brazing alloy. The tubular heater includes an inner tube surrounded by an outer heater sheath. The metal capillary reaction tubing has a high aspect ratio, an inlet port and an outlet port and is wrapped around the tubular heater so that it is in intimate thermal contact with the heater sheath. The brazing alloy permanently bonds the tubular heater with the metal capillary reaction tubing. The metal capillary reaction tubing is configured to be heated by the tubular heater and is configured to receive one or more reactants through the inlet port and to allow the reactants to react under a selected temperature and pressure and to produce one or more products exiting through the outlet port.

30 Claims, 6 Drawing Sheets

(56) References Cited

U.S. PATENT DOCUMENTS

| | | |
|---|---|---|
| 6,667,474 B1 | 12/2003 | Abramson |
| 7,534,402 B2 | 5/2009 | Morse et al. |
| 7,744,830 B2 | 6/2010 | Morse et al. |
| 7,854,902 B2 | 12/2010 | Matteo |
| 7,993,534 B2 | 8/2011 | Morse et al. |
| 8,057,988 B2 | 11/2011 | Morse et al. |
| 2003/0103878 A1 | 6/2003 | Morse et al. |
| 2004/0022691 A1 | 2/2004 | Allen et al. |
| 2005/0009175 A1 | 1/2005 | Bergh et al. |
| 2005/0207953 A1 | 9/2005 | Upadhye et al. |
| 2006/0057450 A1 | 3/2006 | Morse et al. |
| 2007/0009426 A1 | 1/2007 | Levensen |
| 2008/0181829 A1 | 7/2008 | Matteo |
| 2009/0223925 A1 | 9/2009 | Morse et al. |
| 2010/0221667 A1 | 9/2010 | Morse et al. |

FOREIGN PATENT DOCUMENTS

| | | |
|---|---|---|
| WO | 98-13125 A1 | 4/1998 |
| WO | 2010-138693 A1 | 12/2010 |

* cited by examiner

Pt on alumina deposited via wet impregnation
(Y. Choi et al., J MATER SCI 41 (2006) 2333-2338)

Pt on silica deposited via atomic layer deposition
(J. Li et al, Applied Catalysis B: Environmental (2010))

SYSTEM AND METHOD FOR A MICROREACTOR

CROSS REFERENCE TO RELATED CO-PENDING APPLICATIONS

This application claims the benefit of U.S. provisional application Ser. No. 61/494,548 filed on Jun. 8, 2011 and entitled SYSTEM AND METHOD FOR A MICROREACTOR which is commonly assigned and the contents of which are expressly incorporated herein by reference.

FIELD OF THE INVENTION

The present invention relates to a system and method for a microreactor and in particular to a cartridge-based microreactor with atomic layer deposition capability.

BACKGROUND OF THE INVENTION

Currently, microreactors are seeing increased use in small-scale, high efficiency, and reduced waste chemical manufacturing. However, most current designs have limited temperature and pressure ranges, and it is difficult to produce highly dispersed and high surface area catalysts in these systems.

Accordingly, there is a need for an improved microreactor system that is capable of operating at high temperature and pressure ranges and is capable of producing highly dispersed and high surface area catalysts

SUMMARY OF THE INVENTION

The present invention describes a new type of cartridge-based microreactor with high internal surface area, exceptional thermal conductivity, independently controllable temperatures in excess of 400° C. in each microreactor, pressures in excess of 10 MPa, and the ability to perform "green chemistry" through the use of in-situ aerogels deposited along the length of the reactor.

In general, in one aspect, the invention features a cartridge microreactor including a tubular heater, a metal capillary reaction tubing and a brazing alloy. The tubular heater includes an inner tube surrounded by an outer heater sheath. The metal capillary reaction tubing has a high aspect ratio, an inlet port and an outlet port and is wrapped around the tubular heater so that it is in intimate thermal contact with the heater sheath. The brazing alloy permanently bonds the tubular heater with the metal capillary reaction tubing. The metal capillary reaction tubing is configured to be heated by the tubular heater and is configured to receive one or more reactants through the inlet port and to allow the reactants to react under a selected temperature and pressure and to produce one or more products exiting through the outlet port.

Implementations of this aspect of the invention may include one or more of the following The brazing alloy permanently bonds the tubular heater with the metal capillary reaction tubing by first painting the brazing alloy over the metal capillary reaction tubing and the outer heater sheath and then reflowing the brazing alloy by raising the temperature of the microreactor above the brazing alloy's melting temperature and subsequently solidifying the reflowed brazing alloy by reducing the temperature of the microreactor below the brazing alloy's melting temperature. The brazing alloy comprises a silver-nickel brazing alloy paste or a silver solder. The metal capillary reaction tubing comprises a nickel electroformed tubing, stainless steel tubing or other metal tubing. The metal capillary reaction tubing may include a coated inner surface. The inner surface of the metal capillary reaction tubing may be coated with silica. The silica may be deposited via atomic layer deposition of chemical vapor deposition after the metal capillary reaction tubing is installed into the microreactor. The microreactor may further include a cooling line being wrapped around the tubular heater and arranged parallel to the metal capillary reaction tubing. The microreactor may further include an outer insulating layer. The microreactor further includes a high surface area support uniformly deposited in the inner wall of the metal capillary reaction tubing. The high surface area support comprises an aerogel deposited in-situ in the inner wall of the metal capillary reaction tubing. The aerogel is uniformly deposited in the inner wall of the metal capillary reaction tubing by first flowing a solution comprising a pre-methanolyzed or partially methanolyzed solution of nitric acid, urea, water, and tetramethyl orthosilicate (TMOS) through the metal capillary reaction tubing, next heating the microreactor to break down the urea and to produce ammonium hydroxide, subsequently neutralizing the nitric acid with the ammonium hydroxide to produce ammonium nitrate and to produce a basic solution, next increasing the reaction rate of condensation with the basic solution thereby resulting in a polymer-like gel of amorphous silica and finally removing residual byproducts via supercritical drying thereby resulting in a uniformly deposited silica aerogel. The microreactor further includes a small open channel through the center of the deposited aerogel and the open channel reduces the pressure drop across the microreactor, and provides reactant and product exchange with the aerogel via diffusion. The open channel is formed by threading a narrow carbon filament through the metal capillary reaction tubing and then burning the carbon filament out after the aerogel is deposited.

In general, in another aspect, the invention features a microreactor system comprising a plurality of cartridge microreactors connected with each other in serial or in parallel. Each cartridge microreactor includes tubular heater, a metal capillary reaction tubing and a brazing alloy. The tubular heater includes an inner tube surrounded by an outer heater sheath. The metal capillary reaction tubing has a high aspect ratio, an inlet port and an outlet port and is wrapped around the tubular heater so that it is in intimate thermal contact with the heater sheath. The brazing alloy permanently bonds the tubular heater with the metal capillary reaction tubing. The metal capillary reaction tubing is configured to be heated by the tubular heater and is configured to receive one or more reactants through the inlet port and to allow the reactants to react under a selected temperature and pressure and to produce one or more products exiting through the outlet port.

In general, in another aspect, the invention features a method for producing a cartridge microreactor including the following steps. Providing a tubular heater comprising an inner tube surrounded by an outer heater sheath. Next, providing a metal capillary reaction tubing comprising a high aspect ratio, an inlet port and an outlet port and wrapping the metal capillary reaction tubing around the tubular heater so that it is in intimate thermal contact with the heater sheath. Next, permanently bonding the tubular heater with the metal capillary reaction tubing with a brazing alloy. The metal capillary reaction tubing is configured to be heated by the tubular heater and is configured to receive one or more reactants through the inlet port and to allow the reactants to react under a selected temperature and pressure and to produce one or more products exiting through the outlet port.

Implementations of this aspect of the invention may include one or more of the following features. The tubular heater is permanently bonded with the metal capillary reaction tubing by first painting the brazing alloy over the metal capillary reaction tubing and the outer heater sheath and then reflowing the brazing alloy by raising the temperature of the microreactor above the brazing alloy's melting temperature and subsequently solidifying the reflowed brazing alloy by reducing the temperature of the microreactor below the brazing alloy's melting temperature. The brazing alloy comprises a silver-nickel brazing alloy paste or a silver solder. The metal capillary reaction tubing comprises a nickel electroformed tubing, stainless steel tubing or other metal tubing. The metal capillary reaction tubing may include a coated inner surface. The inner surface of the metal capillary reaction tubing may be coated with silica. The silica may be deposited via atomic layer deposition of chemical vapor deposition after the metal capillary reaction tubing is installed into the microreactor. The microreactor may further include a cooling line being wrapped around the tubular heater and arranged parallel to the metal capillary reaction tubing. The microreactor may further include an outer insulating layer. The microreactor further includes a high surface area support uniformly deposited in the inner wall of the metal capillary reaction tubing. The high surface area support comprises an aerogel deposited in-situ in the inner wall of the metal capillary reaction tubing. The aerogel is uniformly deposited in the inner wall of the metal capillary reaction tubing by first flowing a solution comprising a pre-methanolyzed or partially methanolyzed solution of nitric acid, urea, water, and tetramethyl orthosilicate (TMOS) through the metal capillary reaction tubing, next heating the microreactor to break down the urea and to produce ammonium hydroxide, subsequently neutralizing the nitric acid with the ammonium hydroxide to produce ammonium nitrate and to produce a basic solution, next increasing the reaction rate of condensation with the basic solution thereby resulting in a polymer-like gel of amorphous silica and finally removing residual byproducts via supercritical drying thereby resulting in a uniformly deposited silica aerogel. The microreactor further includes a small open channel through the center of the deposited aerogel and the open channel reduces the pressure drop across the microreactor, and provides reactant and product exchange with the aerogel via diffusion. The open channel is formed by threading a narrow carbon filament through the metal capillary reaction tubing and then burning the carbon filament out after the aerogel is deposited. The method further includes depositing a catalyst on the high surface area support via atomic layer deposition.

Among the advantages of this invention may be one or more of the following. The microreactor system of the present invention is easy to use in parallel as a catalyst screening system or in series as a small-scale chemical synthesis system. Catalysts may be deposited onto incorporated aerogels using techniques such as atomic layer deposition (ALD) and co-gelation. The microreactor system also enables "green chemistry" with supercritical carbon dioxide as a substitute solvent for toxic and expensive organic solvents, allows for an arbitrary number of sequential chemical operations each with different residence times, catalysts, temperatures, and has the ability to add additional reactants between any two stages with minimal dead space.

The market for chemicals worldwide is approximately $3T and produces over 70,000 different individual chemicals. Of this market, specialty and life science chemicals make up approximately 50% of the overall market. These chemicals typically have high values ($1-10/kg) but often have low total demand per chemical, making it desirable to produce these chemicals in benchtop microreactors as an alternative to traditional reactor designs. With increasing concern for environmental impact, the ability to move from typical organic solvents to supercritical carbon dioxide can reduce waste, simplify processing, and reduce cost. Continuous production in catalytic microreactors would also allow for efficiency improvements and decreased waste in a broad range of manufacturing environments, especially as compared to chemicals currently manufactured using batch processing. This technology helps chemical manufacturers operate more safely and more efficiently in both feedstock utilization and in terms of direct energy use.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

The present invention describes a new cartridge-based microreactor utilizing high thermal conductivity metal capillary tubing to allow for high pressures, high temperatures, and inexpensive construction. Additionally, this invention describes the in-situ synthesis of high surface area aerogels throughout the inner volume of these microreactors to act as a support for a variety of modern and traditional catalyst deposition techniques including atomic layer deposition (ALD), co-gelation during aerogel formation, supercritical nanoparticle synthesis and deposition, and traditional wet impregnation techniques such as strong electrostatic absorption.

This microreactor system allows for both the rapid development of high performance nanocatalysts through a screening configuration as well as provides an inexpensive and robust microreactor system for sequential processing of chemicals. The present microreactor system has the ability to:
1. Add reactants at any step in the process with mixing accomplished by a small mixing manifold between cartridge reactors.

2. Provide high surface area aerogels inside of each cartridge reactor.
3. Provide several simple routes to deposit catalyst on aerogels, including atomic layer deposition, co-gelation during aerogel synthesis, supercritical deposition, and traditional wet impregnation.
4. Allow each step to be held at a different temperature with extremely high thermal transport.
5. Safely handle highly endothermic or exothermic reactions without losing performance.
6. Handle high temperatures (400° C.) and pressures (10 MPa).
7. Perform continuous flow processing using "green" supercritical carbon dioxide as a solvent.
8. Perform medium-throughput screening of nano-catalysts and screen reaction conditions with an in-situ mass spectrometer to optimize reaction conditions.

The microreactor may be applied in a variety of markets, including large chemical production companies, fine chemical manufacturers producing small quantities of a variety of high value chemicals, and small-scale fine chemical startups producing moderate quantities of one or a few high value chemicals, among others. Large chemical production companies may use the present microreactor for improving energy efficiency and product yields in large commodity chemical plants, through the use of a large number of parallel, inexpensive microreactors. In this application, the primary advantages are decreased risk in scale-up from laboratory scale to pilot scale, the ability to downturn production during periods of decreased demand, the ability to replace catalyst/reactor with minimal downtime, decreased cost of postprocessing through the use of green chemistry, higher performance in highly endothermic or exothermic reactions, and increased safety. Fine chemical manufacturers may use the present microreactor for producing small quantities of a variety of high value chemicals which require catalytic, high pressure, and high temperature reactors not currently available as a benchtop microreactor. Small-scale fine chemical startups may use the present microreactor to produce moderate quantities of one or a few high value chemicals and then to rapidly move from small scale, high cost batch production to continuous production. Small-scale fine chemical startups may use a highly optimized catalytic reactor to decrease time-to-market and increase the odds that these research companies can survive to profitability.

Cartridge Microreactor

The cartridge microreactor uses high thermal conductivity metal capillary tubing which is wrapped around an inexpensive cartridge heater and subsequently bonded permanently to the sheath of the cartridge heating using a silver braze This allows for extreme modularity, highly isothermal operation, and minimal heater losses to the environment when combined with insulation. As an alternative to brazing, casting, soldering, or vapor/spray coating methods could be used; however, brazing is likely to be the best solution in terms of manufacturability and cost.

Figure 1A:
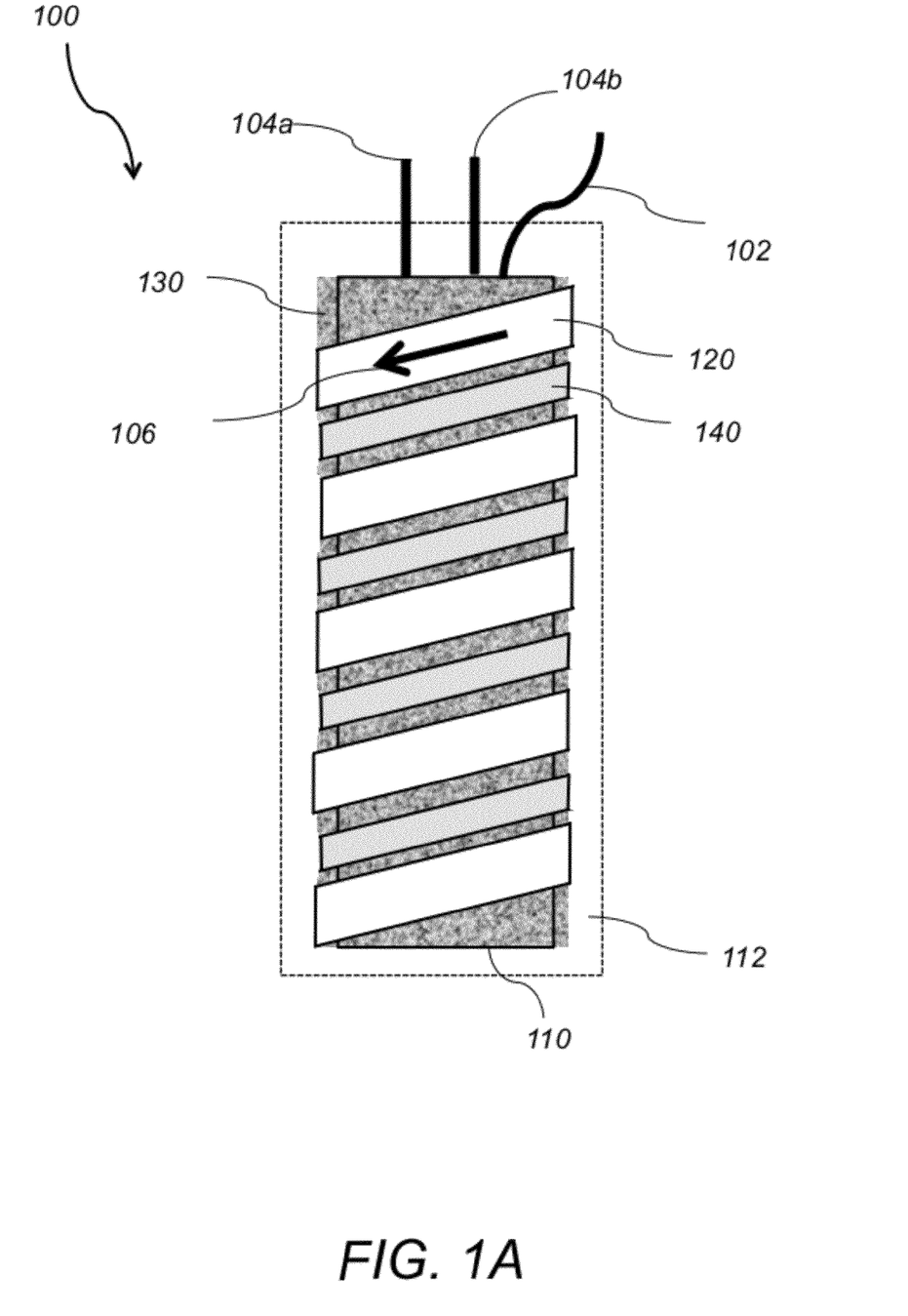
FIG. 1A is a schematic diagram of the cartridge microreactor design.

Referring to FIG. 1A, a cartridge microreactor 100 includes a cartridge or tubular heater 110, metal capillary reaction tubing 120, a brazing alloy 130, a cooling line 140 and an insulating layer 112. In one example, cartridge 110 is a commercially available tubular heater with an incoloy outer sheath, provided by Omega Engineering, Stamford, Conn. Cartridge 110 has an integrated thermocouple 102 for temperature control and connector for receiving power. Metal capillary reaction tubing 120 includes an inlet port 104a and an outlet port 104b and is wrapped around the heater 110 so that it is in intimate contact with the heater sheath. In one example, metal capillary tubing, is a nickel electroformed tubing with an outer diameter (OD) of 360 µm. In other examples, the metal capillary tubing is made of stainless steel or other metals and has a coated inner surface. The inner surface may be coated with silica. The silica coating may be deposited via atomic layer deposition or chemical vapor deposition after the metal capillary tubing is installed in the microreactor. Brazing alloy 130 is painted over the tubing 120 and heater 110 and then the cartridge heater 110 is heated above the brazing temperature thereby resulting in a mechanically robust single module with exceptionally high thermal transport from heater sheath to tubing. In one example, the brazing alloy is a silver-nickel brazing alloy paste which melts at 800° C. or a silver solder.

Insulating layer 112 is a machined insulation hole with fluid flow entering and exiting from one side (104a, 104b), along with electrical controls and thermocouple 102. Cooling line 140 is a secondary parallel cooling line that is carried next to the reaction tubing 120. The use of both a reaction tubing 120 and a cooling tubing 140 results in the ability to provide both active heating and active cooling and thereby produces better temperature control.

Figure 1B:
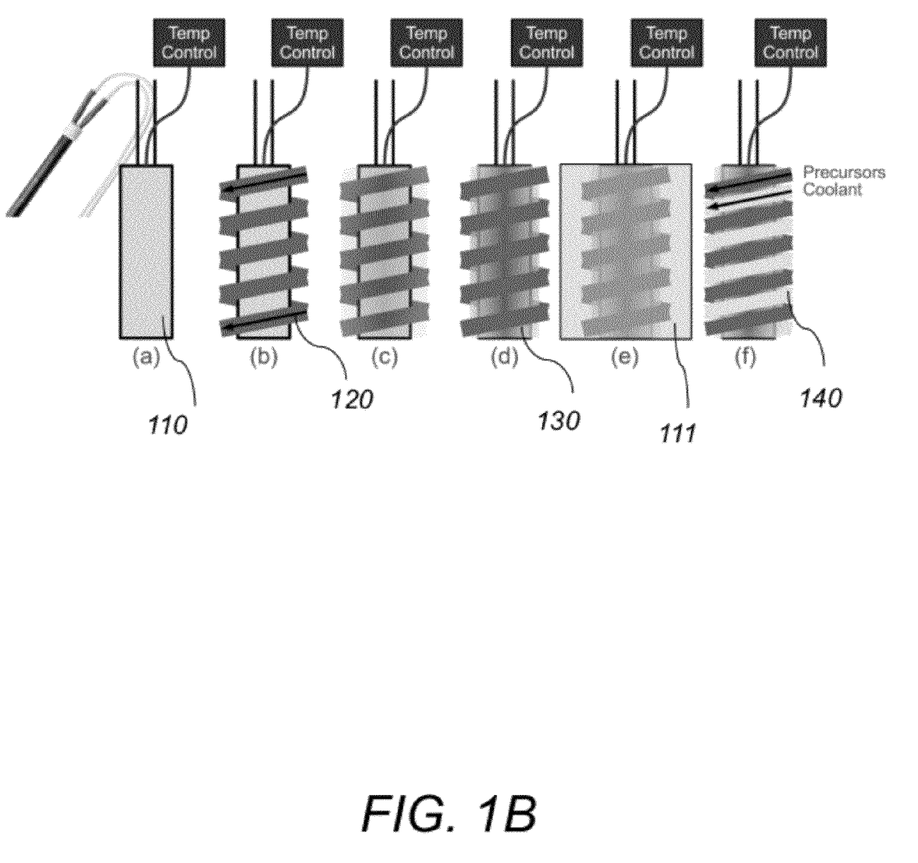
FIG. 1B is a schematic diagram of the method step for producing the microreactor of FIG. 1A.

Referring to FIG. 2B, the a cartridge microreactor 100 is assembled by first taking a commercially available tubular heater with an incoloy outer sheath 110 and cutting a desired length (a). Next, metal capillary tubing 120 is wrapped around the tubular heater 110 so that it is in intimate contact with the heater sheath (b) and then silver braze/silver solder of an appropriate alloy is painted over the tubing 120 and heater 110 (c). Next, the cartridge heater 110 is heated above the brazing temperature using either the built in heater, or by placing the cartridge in an externally heated environment (d). The melting of the painted brazing alloy and the following solidification of the painted brazing alloy results in producing a mechanically robust single cartridge module that has exceptionally high thermal transport from the heater sheath to the tubing and to the contained reactants. Next, the cartridge is inserted into a machined insulation hole 114 arranged so that fluid flow enters and exits the reaction tubing 120 from one side (104a, 104b), along with electrical controls and thermocouple 102 (e). A secondary parallel cooling line 140 is also wrapped next to the reaction tubing 120, resulting in the ability to provide both active heating and active cooling in order to produce better temperature control (f).

The primary advantages of microreactors are the small amount of sample required, enhanced heat transfer characteristics, laminar flow condition, portability, lower power consumption, lower environmental footprint, and easy parallelization. These features provide advantages in selectivity, yield, and product consistency. The present design allows for each individual cartridge microreactor to have completely independent temperature control, extremely high thermal conductivity between the tubing walls and the heater, and the use of metal allows for very rapid heat transport directly from the heater to catalysts deposited inside of the tubing as well as a much higher temperature and pressure than are allowable in current microreactor systems.

By choosing an appropriate brazing alloy, it is ensured that the temperature at which paste reflows is between the target temperature of operation and the temperature limits of the cartridge heater. For example, a "medium" silver jewelers' solder has a reflow temperature of approximately 700° C. while an incoloy sheath cartridge heater from Omega has a temperature limit of approximately 800° C. due to heating element design. This choice of heater, tubing, and brazing alloy allows brazing to be completed by simply turning on the cartridge heater to the maximum temperature until reflow occurs. The result of this process is a mechanically robust drop-in microreactor cartridge module with extremely high thermal conductivity between the cartridge heater sheath and the metal tubing, allowing for essentially isothermal operation even for highly exothermic or endothermic chemical reactions. Additionally, this design allows for independent temperature control of each microreactor module, and many cartridge heaters can be purchased with integrated thermocouples for simple temperature control.

In this embodiment, nickel tubing is used for the purpose of simplifying validation with inductively coupled plasma mass spectrometry. However, if increased corrosion resistance is desired, other readily commercially available tubing can be substituted, for examples stainless steel or more expensive inconel tubing for extremely high corrosion resistance at a decreased thermal performance. This design allows for handling of vacuum, liquids, gases, and supercritical solvents as well as corrosive or dangerous precursors.

After producing a single microreactor cartridge module 100, with reactant inlet 104a and product outlet 104b on one side along with electrical connections and thermocouple 102 for temperature control, the module is inserted into a slot in a machined insulation block 112, for instance alumina, to allow for temperatures in each module to be maintained independently and insulated independently from all other modules. These modules can then be used as a standalone unit, in series for achieving sequential steps with each step set for a different temperature, residence time, added reactants and catalyst, or in parallel for in-situ catalyst deposition and testing using atomic layer deposition. Inlet and outlet tubing can also be twisted together and/or brazed to provide an inexpensive heat exchanger.

Figure 2:
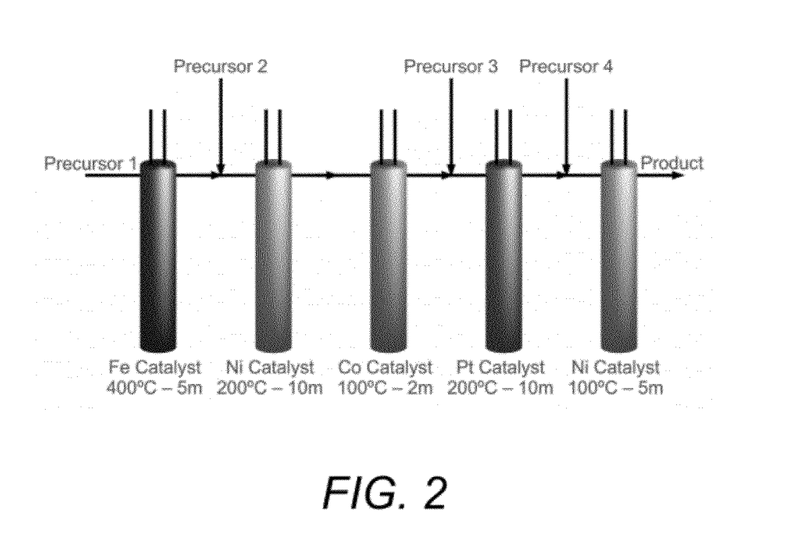
FIG. 2 is a schematic diagram of a serial arrangement of microreactors.

FIG. 2 depicts an example of a serial topology for a cartridge microreactor system. In this example, precursor 1 is passed through 5 m of microreactor tubing 210a with iron catalyst held at 400° C., followed by subsequent mixing with precursor 2, flow through 10 m of Ni-catalyst tubing 210b at 200° C., flow through 2 m of Co-catalyst tubing 210c at 100° C., mixing with precursor 3, flow through 10 m of Pt-catalyst tubing 210d at 200° C., mixing with precursor 4, and finally flow through 5 m of Ni-catalyst tubing 210e at 100° C. before the product stream is collected and post-processed.

Figure 3:
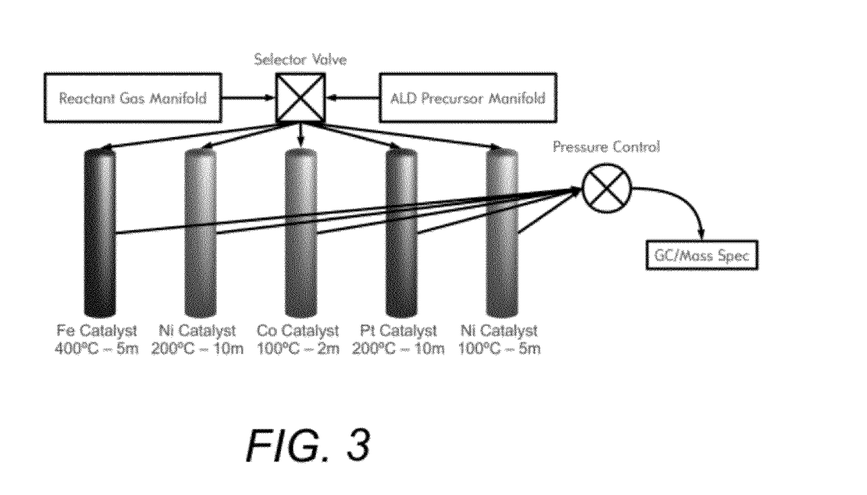
FIG. 3 is a schematic diagram of a parallel arrangement of microreactors.

FIG. 3 depicts an example of a parallel topology for a cartridge microreactor system to produce a catalyst screening reactor. In this case, five cartridge reactors 210a-210e with different lengths can be catalytically promoted individually using a selector valve 220 to put a particular reactor on stream, followed by atomic layer deposition of a catalyst of interest on the internal aerogel support. Subsequently, reactant gases for a test reaction can flow through each reactor in turn while temperature and pressure are varied through a range of likely conditions to identify which catalyst, temperature, pressure, and flow rate produce the most optimized overall process. A system such as this could be used to optimize reactor conditions when switching to a supercritical solvent or to identify the best performing catalyst from an array of possible catalyst deposition conditions.

The primary difficulty with constructing catalytic microreactor systems centers on the difficulty of forming high surface area structures which achieve good adhesion to the microreactor walls. Some simple techniques involve the etching and oxidation of microreactor walls in order to form an oxide support. Other techniques involve using either a catalyst and binder or a precursor and nucleation agent in an attempt to produce catalyst particles bound to the inner walls of the microreactor. Finally, there are vapor deposition methods. These techniques generally produce nearly atomically thin, uniform films with good adhesion. However, these films have limited accessible surface area. The present invention utilizes atomic layer deposition for forming high surface area structures. Atomic layer deposition provides a uniquely appropriate match to capillary tube based microreactors, as this technique allows for the uniform deposition of thin films across the entire length of very long tubes without issues of clogging likely to occur with less controlled deposition methods.

Aerogel Synthesis

Aerogels are extremely high surface area (1000 $m^2/gm$) supports that are popular as possible catalyst supports due to their extremely high surface area and porosity. However, a difficulty in the deposition of aerogels uniformly throughout the length of a ten meter long small diameter capillary tube is that condensation of silica precursors into a network is typically accomplished by increasing pH. In the case of a high-aspect tube, the injection of a base under laminar flow conditions where the increase of pH dramatically increases viscosity is likely to result in both poor mixing as well as blockages in the length of the tube which prevent uniform pH change. As an initial promising route to achieving this uniform nucleation, this invention utilizes urea as a "delay base." Upon heating with water, urea is broken down into ammonium hydroxide while releasing carbon dioxide, resulting in an increased pH in solution, typically occurring over approximately one hour when held at 90° C. Urea along with a silica precursor such as tetramethyl orthosilicate can be mixed with an acid in water to encourage methanolysis and create silicon tetrahydroxide. Subsequent heating will raise the pH and encourage condensation of metal-hydroxide complexes into a polymer-like gel of silicon oxides. After gelation, the mixture of methanol and water in the pores can be removed supercritically via either solvent replacement or direct removal.

Figure 4:
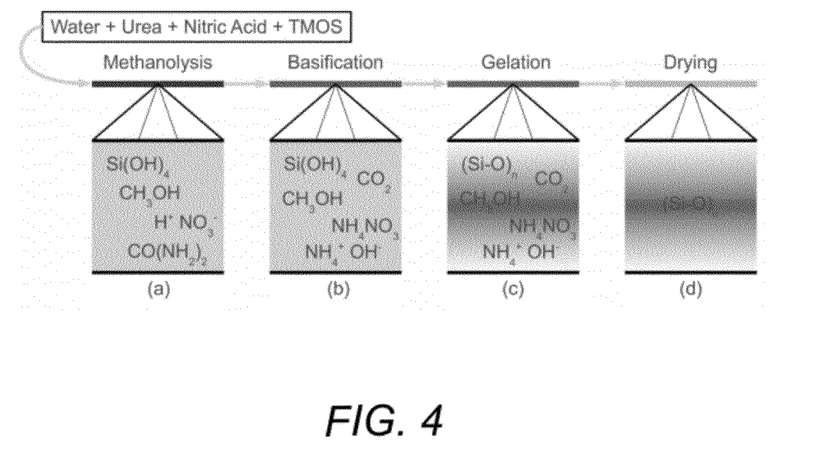
FIG. 4 is a schematic process diagram of the in-situ aerogel preparation method.

FIG. 3 depicts a process diagram for in-situ aerogel preparation. (a) In the first step, a pre-methanolyzed or partially methanolyzed solution of nitric acid, urea, water, and tetramethyl orthosilicate (TMOS) flows through the arbitrary length of tubing. TMOS is methanolyzed to silicon hydroxide and the resulting solution is highly acidic. (b) Upon heating, urea breaks down to produce ammonium hydroxide which neutralized nitric acid to produce ammonium nitrate and raises the pH. (c) Basic solution increases the reaction rate of condensation, resulting in a polymer-like gel of amorphous silica. (d) Supercritical drying removes residual byproducts, resulting in a silica aerogel without the need to add precursors at any point during reaction.

In order to enhance flow characteristics, it may be desirable to provide a small open channel through the center of the aerogel. This channel would help reduce pressure drop across the microreactor, and due to the size scales, diffusion is likely to be sufficient to provide reactant and product exchange with the aerogel. This channel can be produced by threading a narrow carbon filament through the tube which is burned out after the aerogel is formed.

Atomic Layer Deposition

After forming an aerogel support, catalysts can be deposited on the support through a variety of techniques. In one example atomic layer deposition (ALD) is used.

The ALD process involves a step-by-step growth of an atomically thin film with two half-cycles. In the first cycle, a precursor is deposited on a surface which passivates the surface to prevent further precursor deposition. This often takes the form of an organometallic precursor interacting with surface oxygen to release carbon monoxide while forming a covalent bond between a metal complex and the surface. For example, in the deposition of platinum, the first half cycle results in an organic-platinum complex in a passivating monolayer on the surface. Subsequent addition of oxygen forms a new surface for further deposition. After heat treatment, this deposition forms nanoclusters with a typical size of 1.3 nm, and a dispersion of 90%. Materials can also be deposited with ALD as a conformal thin film. For instance, aluminum oxide and zinc oxide can be deposited as alternating conformal thin films.

Figure 5:
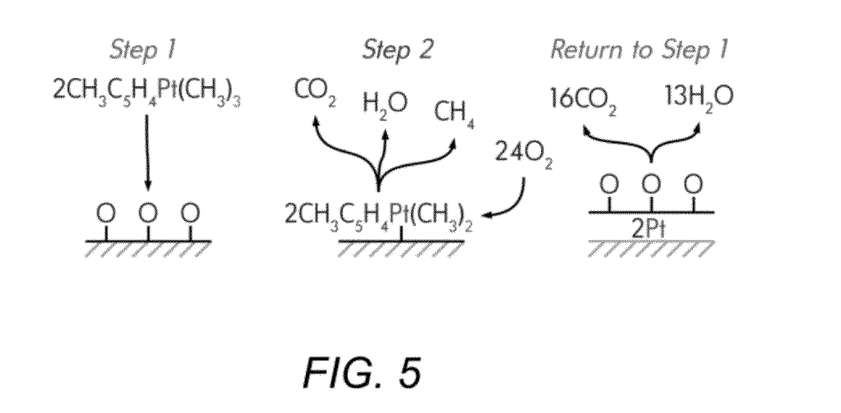
FIG. 5 is a schematic process diagram of the atomic layer deposition (ALD) of Platinum.
Figure 6A:
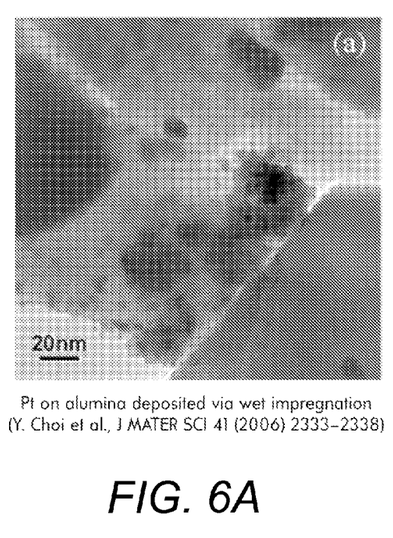
FIG. 6A depicts an SEM image of a Platinum film deposited via wet impregnation.
Figure 6B:
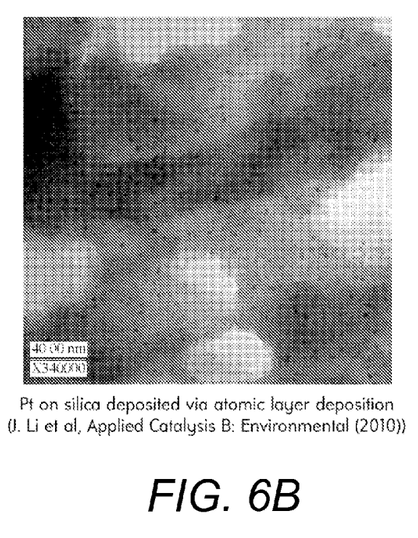
FIG. 6B depicts an SEM image of a Platinum film deposited via ALD.
Figure 7A:
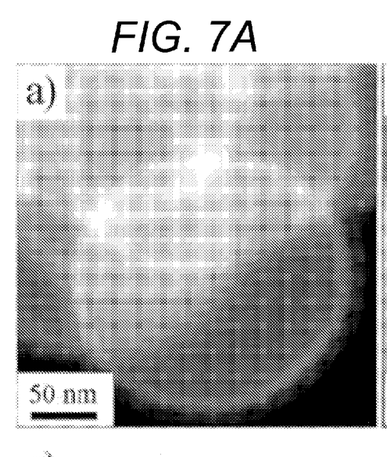
FIG. 7A depicts a STEM image of a multilayer ALD film coating of SiO2 spheres.
Figure 7B:
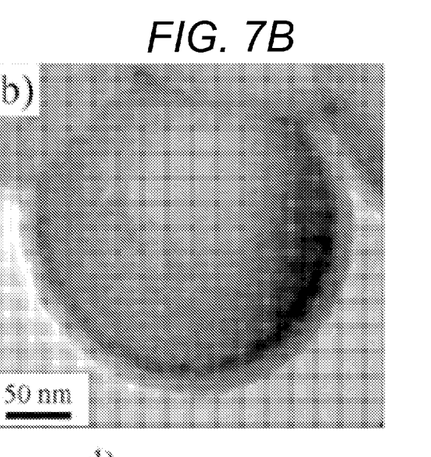
FIG. 7B depicts a cross-sectional TEM image of the coated SiO2 spheres.
Figure 7C:
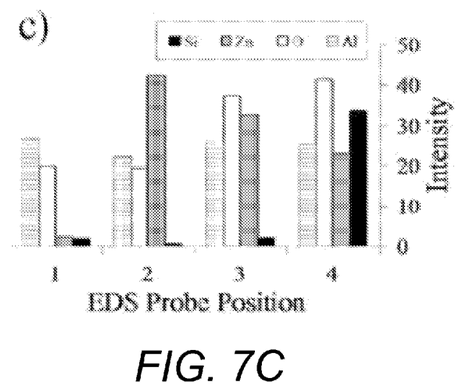
FIG. 7C depicts EDS data corresponding to four positions along the composite radius of the coated SiO2 spheres.
Figure 7D:
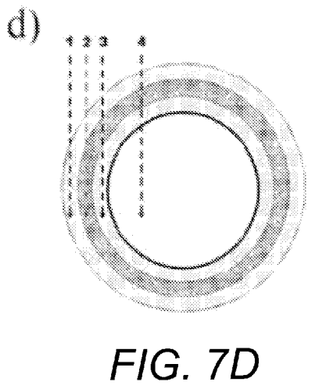
FIG. 7D depicts the four positions along the composite radius of the coated SiO2 spheres of FIG. 7C.

Referring to FIG. 5, platinum precursor reacts with surface oxygen to release water, methane, and carbon dioxide along with a self-passivating layer. Subsequent reaction with oxygen forms platinum with adsorbed oxygen to renew the original surface and allow a second deposition of platinum precursor.

ALD nano-catalysts have not been extensively studied outside of academia due to the relatively recent discovery of the technique. Experiments conducted by the inventor of this invention have shown evidence of significantly improved performance in the vapor phase upgrading of pyrolysis oil, an important catalytic reaction to achieve widespread adoption of third-generation biofuels from cellulosic feedstock. In this experiment, the amount of levoglucosan, a largely unusable byproduct, produced in the reaction is reduced to undetectable levels. This catalyst outperformed commercial zeolite catalysts under identical experimental conditions.

Co-Gelation to Produce Catalytic Aerogels

Co-gelation as a technique to produce catalytic aerogels has been studied extensively. In this process, an alkoxysilane-functionalized ligand capable of complexing with a metal of interest. This is generally accomplished by combining a metal precursor such as an acetate, acetylacetonate, or nitrate with an alkoxysilane-functionalized ligand such as 3-(aminopropyl)triethoxysilane. The resulting complex is capable of participating directly in the sol-gel chemistry and undergoes hydrolysis and condensation in a similar fashion to a precursor such as TMOS. The result is that the promoting metal catalyst is incorporated fully into the aerogel matrix as opposed to other techniques in which the catalyst is deposited on the surface of the catalyst. Generally speaking, the nanopores in the aerogel allow sufficient fluid exchange between the catalyst and the reactants to allow good activity. Incorporation into the aerogel matrix by this technique results in excellent thermal stability.

Strong Electrostatic Adsorption, Supercritical Deposition, and General Wet Impregnation Strong electrostatic adsorption is a form of directed wet impregnation where the surface charge of a catalyst support is carefully controlled in order to deposit materials currently impossible with atomic layer deposition. This charge control is frequently achieved by careful control of precursor solution pH, taking advantage of the ability to protonate or deprotonate terminal hydroxyl groups on the surface nickel oxide surface. The required pH can be determined by measuring the point of zero charge for the nickel oxide surface. For pH values above the point of zero charge terminal hydroxyl groups will deprotonate and become negatively charged.

For example, a gold precursor such as gold nitrate is pH adjusted to be at above the point of zero charge and flows through the microreactor with positive gold ions becoming electrostatically bound to the negatively charged terminal hydroxyl groups on the tube surface. Subsequent oxidation in combination with heating can then remove nitrate groups in the form of nitrogen oxides leaving gold nanoparticles. This process can be done similarly using other inexpensive nitrate precursors in cases where there are no current methods known to use ALD to deposit the material.

Alternatively, the tube surface can be coated with a highly negatively charged thin film of a polymer. This can be used to modify the point of zero charge of the surface and form gold-polymer complexes bound to the surface. Subsequent oxidation in combination with heating can then produce gold nanoparticles. In this technique, adhesion may suffer, but dispersion may be significantly higher and selectivity may similarly be higher compared to the use of pH for electrostatic adsorption. There are many other similar techniques such as dendrimer-metal polymers and ion exchange which may also be feasible options, but are likely to be significantly more costly and complicated than strong electrostatic adsorption. Similarly, deposition-precipitation can be used, but will likely result in poor adhesion as compared to other techniques.

These techniques may also be used in a supercritical deposition, for example of cerium oxide nanoparticles in supercritical methanol. This type of synthesis allows for uniform particle size distributions and excellent control over size and phase of the formed material. Other particles such as titania, zinc oxide, copper, and nickel can be readily formed using supercritical deposition.

The microreactor system of the present invention is capable of:
1. Sustained temperatures of 400° C.
2. Sustained pressures of 10 MPa.
3. Flow control of a single reactant stream.
4. Pressure control in a single cartridge microreactor.

The test equipment is capable of meeting all minimum design requirements necessary for further experimentation with in-situ aerogel synthesis. This includes the ability to flow an aerogel precursor solution including nitric acid, water, ethanol, urea, and tetramethyl orthosilicate without corrosion or clogging issues at pressure of at least 10 MPa and to hold that pressure under heating to at least 150° C.

Several embodiments of the present invention have been described. Nevertheless, it will be understood that various modifications may be made without departing from the spirit and scope of the invention. Accordingly, other embodiments are within the scope of the following claims.

What is claimed is:

1. A cartridge microreactor comprising:
a tubular heater comprising an inner tube surrounded by an outer heater sheath;
a metal capillary reaction tubing comprising an inlet port and an outlet port and being wrapped around the tubular heater so that it is in intimate thermal contact with the heater sheath; and
a brazing alloy permanently bonding the tubular heater with the metal capillary reaction tubing; and
wherein the metal capillary reaction tubing is configured to be heated by the tubular heater and is configured to receive one or more reactants through the inlet port and to allow the reactants to react under a selected temperature and pressure and to produce one or more products exiting through the outlet port.

2. The microreactor of claim 1 wherein the brazing alloy permanently bonds the tubular heater with the metal capillary reaction tubing by first painting the brazing alloy over the metal capillary reaction tubing and the outer heater sheath and then reflowing the brazing alloy by raising the temperature of the microreactor above the brazing alloy's melting temperature and subsequently solidifying the reflowed brazing alloy by reducing the temperature of the microreactor below the brazing alloy's melting temperature.

3. The microreactor of claim 1, wherein the brazing alloy comprises a silver-nickel brazing alloy paste or a silver solder.

4. The microreactor of claim 1, wherein the metal capillary reaction tubing comprises a nickel electroformed tubing or stainless steel tubing.

5. The microreactor of claim 4, wherein the metal capillary reaction tubing comprises a coated inner surface.

6. The microreactor of claim 4, wherein the inner surface of the metal capillary reaction tubing is coated with silica.

7. The microreactor of claim 4, wherein the inner surface of the metal capillary reaction tubing is coated with silica via atomic layer deposition or chemical vapor deposition after it is installed into the microreactor.

8. The microreactor of claim 1, further comprising a cooling line being wrapped around the tubular heater and arranged parallel to the metal capillary reaction tubing.

9. The microreactor of claim 1, further comprising an outer insulating layer.

10. The microreactor of claim 1, further comprising a high surface area support uniformly deposited in the inner wall of the metal capillary reaction tubing.

11. The microreactor of claim 10, wherein the high surface area support comprises an aerogel deposited in-situ in the inner wall of the metal capillary reaction tubing.

12. The microreactor of claim 11, wherein the aerogel is uniformly deposited in the inner wall of the metal capillary reaction tubing by first flowing a solution comprising a pre-methanolyzed or partially methanolyzed solution of nitric acid, urea, water, and tetramethyl orthosilicate (TMOS) through the metal capillary reaction tubing, next heating the microreactor to break down the urea and to produce ammonium hydroxide, subsequently neutralizing the nitric acid with the ammonium hydroxide to produce ammonium nitrate and to produce a basic solution, next increasing the reaction rate of condensation with the basic solution thereby resulting in a polymer-like gel of amorphous silica and finally removing residual byproducts via supercritical drying thereby resulting in a uniformly deposited silica aerogel.

13. The microreactor of claim 12, further comprising a small open channel through the center of the deposited aerogel and wherein said open channel reduces the pressure drop across the microreactor, and provides reactant and product exchange with the aerogel via diffusion.

14. The microreactor of claim 13, wherein the open channel is formed by threading a narrow carbon filament through the metal capillary reaction tubing and then burning the carbon filament out after the aerogel is deposited.

15. A microreactor system comprising a plurality of cartridge microreactors connected with each other in series and wherein each cartridge microreactor comprises:
a tubular heater comprising an inner tube surrounded by an outer heater sheath;
a metal capillary reaction tubing comprising an inlet port and an outlet port and being wrapped around the tubular heater so that it is in intimate thermal contact with the heater sheath; and
a brazing alloy permanently bonding the tubular heater with the metal capillary reaction tubing; and
wherein the metal capillary reaction tubing is configured to be heated by the tubular heater and is configured to receive one or more reactants through the inlet port and to allow the reactants to react under a selected temperature and pressure and to produce one or more products exiting through the outlet port.

16. A microreactor system comprising a plurality of cartridge microreactors connected with each other in parallel and wherein each cartridge microreactor comprises:
a tubular heater comprising an inner tube surrounded by an outer heater sheath;
a metal capillary reaction tubing comprising an inlet port and an outlet port and being wrapped around the tubular heater so that it is in intimate thermal contact with the heater sheath; and
a brazing alloy permanently bonding the tubular heater with the metal capillary reaction tubing; and
wherein the metal capillary reaction tubing is configured to be heated by the tubular heater and is configured to receive one or more reactants through the inlet port and to allow the reactants to react under a selected temperature and pressure and to produce one or more products exiting through the outlet port.

17. A method for producing a cartridge microreactor comprising:
providing a tubular heater comprising an inner tube surrounded by an outer heater sheath;
providing a metal capillary reaction tubing comprising an inlet port and an outlet port and wrapping the metal capillary reaction tubing around the tubular heater so that it is in intimate thermal contact with the heater sheath; and
permanently bonding the tubular heater with the metal capillary reaction tubing with a brazing alloy; and
wherein the metal capillary reaction tubing is configured to be heated by the tubular heater and is configured to receive one or more reactants through the inlet port and to allow the reactants to react under a selected temperature and pressure and to produce one or more products exiting through the outlet port.

18. The method of claim 17, wherein the tubular heater is permanently bonded with the metal capillary reaction tubing by first painting the brazing alloy over the metal capillary reaction tubing and the outer heater sheath and then reflowing the brazing alloy by raising the temperature of the microreactor above the brazing alloy's melting temperature and subsequently solidifying the reflowed brazing alloy by reducing the temperature of the microreactor below the brazing alloy's melting temperature.

19. The method of claim 17, wherein the brazing alloy comprises a silver-nickel brazing alloy paste or a silver solder.

20. The method of claim 17, wherein the metal capillary reaction tubing comprises a nickel electroformed tubing or stainless steel tubing.

21. The method of claim 20, wherein the metal capillary reaction tubing comprises a coated inner surface.

22. The method of claim 21, wherein the inner surface of the metal capillary reaction tubing is coated with silica.

23. The method of claim 21, wherein the inner surface of the metal capillary reaction tubing is coated with silica via atomic layer deposition or chemical vapor deposition after it is installed into the microreactor.

24. The method of claim 17, further comprising providing a cooling line and wrapping the cooling line around the tubular heater so that it is parallel to the metal capillary reaction tubing.

25. The method of claim 17, further comprising providing an outer insulating layer and insulating the microreactor.

26. The method of claim 17, further comprising depositing a high surface area support uniformly in the inner wall of the metal capillary reaction tubing and wherein the high surface area support comprises an aerogel.

27. The method of claim 26, wherein the aerogel is uniformly deposited in the inner wall of the metal capillary reaction tubing by first flowing a solution comprising a pre-methanolyzed or partially methanolyzed solution of nitric acid, urea, water, and tetramethyl orthosilicate (TMOS) through the metal capillary reaction tubing, next heating the microreactor to break down the urea and to produce ammonium hydroxide, subsequently neutralizing the nitric acid with the ammonium hydroxide to produce ammonium nitrate and to produce a basic solution, next increasing the reaction rate of condensation with the basic solution thereby resulting in a polymer-like gel of amorphous silica and finally removing residual byproducts via supercritical drying thereby resulting in a uniformly deposited silica aerogel.

28. The method of claim 27, further comprising forming a small open channel through the center of the deposited aerogel and wherein said open channel reduces the pressure drop across the microreactor, and provides reactant and product exchange with the aerogel via diffusion.

29. The method of claim 28, wherein the open channel is formed by threading a narrow carbon filament through the metal capillary reaction tubing and then burning out the carbon filament after the aerogel is deposited.

30. The method of claim 28 further comprising depositing a catalyst on the high surface area support via atomic layer deposition.

* * * * *